US006681279B1

(12) United States Patent
Peng (10) Patent No.: US 6,681,279 B1
(45) Date of Patent: Jan. 20, 2004

(54) METHOD OF PERFORMING BUS ARBITRATION BETWEEN CONTROL CHIPS IN A CHIPSET WITH PREEMPTIVE CAPABILITY

(75) Inventor: Sheng-Chang Peng, Taipei (TW)

(73) Assignee: Via Technologies, Inc., Taipei Hsien (TW)

( * ) Notice: Subject to any disclaimer, the term of this patent is extended or adjusted under 35 U.S.C. 154(b) by 465 days.

(21) Appl. No.: 09/711,809

(22) Filed: Nov. 13, 2000

(30) Foreign Application Priority Data

Nov. 15, 1999 (TW) .......................................... 88119832 A (51) Int. Cl.[7] ............................................. G06F 13/14
(52) U.S. Cl. ....................... 710/240; 710/241; 710/242; 710/243; 710/244
(58) Field of Search ................................ 710/240–244, 710/105, 260–266

(56) References Cited

U.S. PATENT DOCUMENTS

| 5,513,376 A | * | 4/1996 | Lohmeyer ..................... 710/53 |
| 5,717,154 A | * | 2/1998 | Gulick ......................... 84/604 |
| 5,845,132 A | * | 12/1998 | Walsh et al. ................. 710/260 |
| 5,848,253 A | * | 12/1998 | Walsh et al. ................. 710/308 |
| 5,884,095 A | * | 3/1999 | Wolford et al. ............... 710/25 |
| 6,151,651 A | * | 11/2000 | Hewitt et al. ................ 710/315 |
| 6,393,506 B1 | * | 5/2002 | Kenny ......................... 710/113 |
| 6,499,079 B1 | * | 12/2002 | Gulick ......................... 710/305 |

* cited by examiner

Primary Examiner—Mark H. Rinehart
Assistant Examiner—Kim T. Huynh
(74) Attorney, Agent, or Firm—J.C. Patents (57) ABSTRACT

A method is proposed for the purpose of performing bus arbitration between two control chips in a chipset with preemptive capability. The two control chips can be, for example, a North Bridge chip and a South Bridge chip, of which one is set as bus owner while the other is set as bus receiver at initializtion. During operation, in the event that the current bus receiver intends to carry out a high-priority transaction, it can issue a preemptive request to ask the bus owner to relinquish the control of the bus. In response to this preemptive request, the current bus owner will start a latency timer; and by the time the latency timer reaches its preset time, the current bus owner will unconditionally hand the bus to the current bus receiver, allowing the current bus receiver to become the bus owner, thereby using the bus to carry out the intended high-priority transaction. This preemptive scheme can help enhance the overall system communication perfomance.

11 Claims, 5 Drawing Sheets

METHOD OF PERFORMING BUS ARBITRATION BETWEEN CONTROL CHIPS IN A CHIPSET WITH PREEMPTIVE CAPABILITY

CROSS-REFERENCE TO RELATED APPLICATION

This application claims the priority benefit of Taiwan application serial no. 88119832, filed Nov. 15, 1999.

BACKGROUND OF THE INVENTION

1. Field of the Invention

This invention relates to computer technology, and more particularly, to a method of performing bus arbitration between two control chips in a chipset with preemptive capability.

2. Description of Related Art

Figure 1:
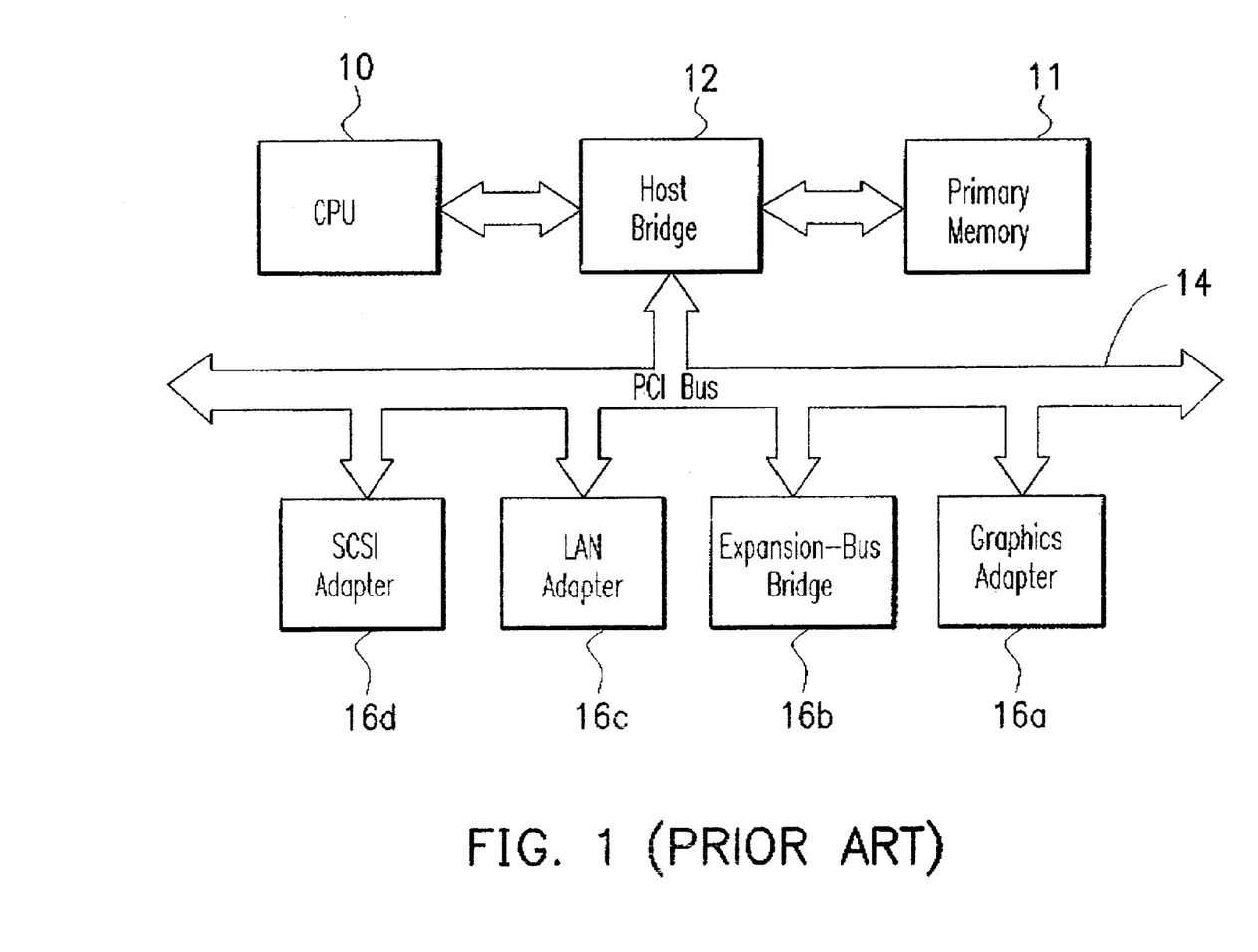
FIG. 1 (PRIOR ART) is a schematic diagram showing the architecture of a computer system with a PCI bus system.

FIG. 1 is a schematic diagram showing the architecture of a computer system with a PCI bus system. As shown, the computer system includes a CPU 10 and a primary memory unit 11, and is coupled via a host bridge 12 to a PCI bus system 14 which is further coupled to a number of PCI-compliant units, such as a graphics adapter 16a, an expansion-bus bridge 16b, a LAN adapter 16c, and a SCSI host bus adapter 16d. Each of these adapters can issue a request (REQ) to use the PCI bus system 14 when transaction over the PCI bus system 14 is intended. The request signal is first sent to the host bridge 12 for arbitration. When the request is granted, the host bridge 12 will return a grant signal (GNT) to grant the use of the PCI bus system 14 by the request-issuing adapter.

Figure 2:
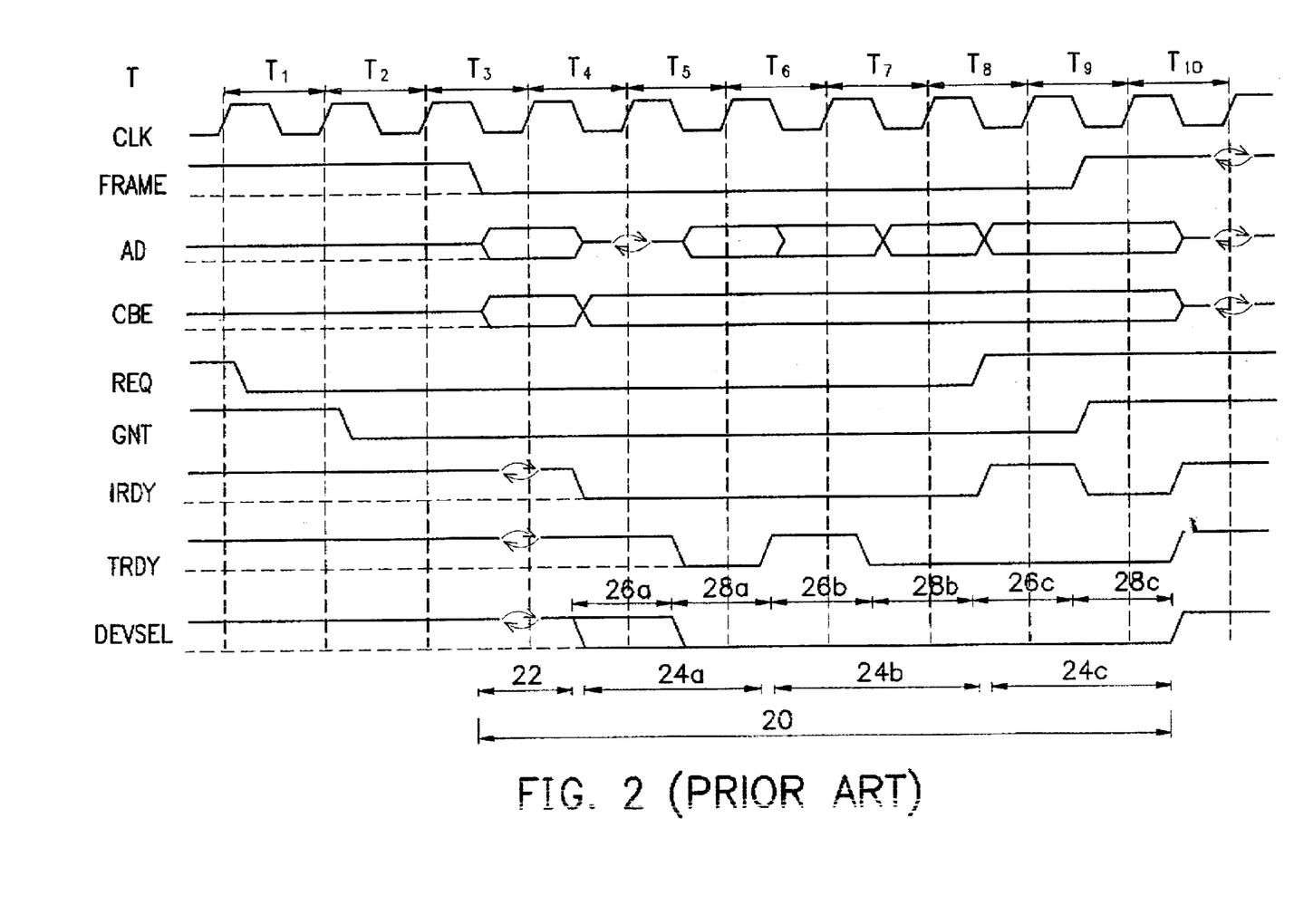
FIG. 2 (PRIOR ART) is a signal diagram showing the waveforms and timings of various signals specified by the PCI standard for an initiator to perform a read operation to a target.

The data communication between the host bridge 12 and the PCI-compliant units 16a, 16b, 16c, 16d over the PCI bus system 14 is achieved through the use of a set of control signals, including FRAME (cycle frame), AD (address), CBE (command/byte enable), REQ (request), GNT (grant), IRDY (initiator ready), TRDY (target ready), and DEVSEL (device select). One example of the timings and waveforms of these signals is illustrated in FIG. 2. In this specification, the term "initiator" refers to the unit that initiates a request to use the PCI bus system 14, which can be either the host bridge 12 or any one of the PCI-compliant units 16a, 16b, 16c, 16d, while the term "target" refers to the unit that the initiator intends to transfer data thereto.

The FRAME signal is issued by the initiator to indicate the starting time and the duration of the intended data communication over the PCI bus system 14. When the FRAME signal is set to LOW state, it enables the initiator to gain access to the PCI bus system 14. During the address phase, the initiator will issue the AD signal indicative of the valid address and the CEE signal (CBE[3:0] for enabling the command/byte transfer. The CBE signal is composed of 4 bits which can represent 16 different commands. The CBE signal format is rally described in the PCI standard, so description thereof will not be further detailed. Subsequently, during the data phase, the initiator will send out the AD signal representative of the data to be transferred over the PCI bus system 14 to the target. When the FRAME signal is disabled, it indicates that the transaction is completed. When the initiator is ready to send out data, the IRDY signal is enabled; and when the target is ready to receive the data, the TRDY signal is enabled. During read operations, the enabling of the IRDY signal indicates that the initiator is ready to receive data from the target; whereas during write operations, the enabling of the TRDY signal indicates that the target is ready to receive data. When the target wants to stop the transaction, it issues the STOP signal to the initiator.

FIG. 2 shows an example of the waveforms and timings of the above-mentioned signals specified by the PCI standard for an initiator to perform a read operation on a target. In this signal diagram, the duration indicated by the reference numeral 20 is called a bus transaction period, during which the data exchange is carried out. The bus transaction period 20 includes an address phase 22 and a number of data phases 24a, 24b, 24c. The data phases 24a, 24b, 24c each include a wait cycle, respectively designated by the reference numerals 26a, 26b, 26c, and a data transfer cycle, respectively designated by the reference numerals 28a, 28b, 28c.

The PCI bus system is clocked by a system clock signal CLK. During the first period $T_1$ of CLK, the initiator issues a FRAME signal to indicate that it intends to transfer data to a certain target. Subsequently, the initiator sends out the AD signal indicative of the start address specifying the target where the initiator intends to read data. After this, the initiator sends out the CBE signal. The CBE signal is in the enabled state during all the data phases 24a, 24b, 24c. During the next period $T_2$, the initiator issues the IRDY signal indicating that it is ready for data communication. However, since this period is the wait cycle 26a in the data phase 24a, the target is still not ready. During the next period $T_3$, the target is ready and hence issues the TRDY signal indicative of this condition. This causes the target to transfer data to the initiator during the data transfer cycle 28a. During the next period $T_4$, the target disables the TRDY signal, indicating that the transfer of the current piece of data is completed, and then prepares the next piece of data for transfer. This is the wait cycle 26b of the data phase 24b. During the next period $T_5$, the target enables the TRDY signal again, indicating that it is ready to transfer data. When the IRDY signal is also enabled during the data transfer cycle 28b, the initiator starts to read data from the target. During the next period $T_6$, the initiator disables the IRDY signal to indicate that it is unable to receive any more data. However, since the TRDY signal is still in the enabled state, the wait cycle 26c is activated by the initiator. During the next period $T_7$, the initiator is again ready to receive data and hence enables the IRDY signal. When the TRDY signal is also enabled during the data transfer cycle 28c, the initiator starts to read data from the target. This completes the read operation.

One drawback to the data communication specified by the PCI standard, however, is that it requires the use of complex control signals with difficult-to-handle waiting states and arbitration. Moreover, it requires at least 45 to 50 pins on the control chipset to handle all the signals specified by the PCI standard. In the system of FIG. 1, for example, the host bridge 12 is implemented by a North Bridge chip, while the expansion-bus bridge 16b is implemented by a South Bridge chip. In most PCs, the South Bridge chip is an indispensable control chip.

In many cases, the transaction between the various chips in a chipset, for example between a South Bridge chip and a North Bridge chip, may use just a small part of the full set of functions specified by the utilized bus standard. The great number of functions are provided in hope that the bus architecture can be adapted for use in many various kinds of environments. This provision, however, may prevent some advanced functions from being incorporated into the bus architecture. As IC packaging technology advances, a control chipset may incorporate an increased number of chips in a single device, but this would also undesirably increase the number of external connecting pins. There exists therefore a need for a bus architecture that can help speed up the transactions between the various chips in a chipset while reducing the total number of external connecting pins of the chipset to minimum. For example, there exists a need for a reduced set of signal lines in the bus between a South Bridge chip and a North Bridge chip, but which is still PCI-compatible so that it can be used together with existing components.

Whenever a chip wants to transfer data, it will issue a request to use the bus. It can then use the bus for data transfer only after it gains the control of the bus. In the event that a chip has high volume video/audio data to transfer over the bus but cannot gain control of the bus in a short time due to the bus being lengthily used by another chip, it would undoubtedly degrade the overall system communication performance.

SUMMARY OF THE INVENTION

It is the objective of this invention to provide a method of performing bus arbitration between two control chips in a chipset with preemptive capability, which allows a high-priority transaction to gain control of the bus through preemptive request in a short time, so that overall system communication performance can be enhanced.

The method of the invention is designed for use on a chipset having a first control chip and a second control chip which are interconnected by a shared bi-directional bus for data transfer between the first control chip and the second control chip. The two control chips can be, for example, a North Bridge chip and a South Bridge chip. By default, one of the two control chips is set as bus owner while the other is set as bus receiver. During operation, when the current bus receiver intends to carry out a high-priority transaction, it can issue a preemptive request to ask the current bus owner to relinquish the control of the bus. In response to this preemptive request, the current bus owner will first start a latency timer; and by the time the latency timer reaches its preset time, the current bus owner will unconditionally hand the bus to the current bus receiver, allowing the current bus receiver to become the bus owner, thereby using the bus to carry out the intended high-priority transaction. This preemptive scheme can help enhance the overall system communication performance.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The invention proposes a method of performing bus arbitration between two control chips in a chipset that are interconnected by a common bus, with the purpose of deciding which one of the control chips is to hold the bus. To achieve this, the invention is characterized in the use of a reduced set of signals, which are collectively referred to as VLINK, in lieu of the conventional PCI-specified set of signals for data communication between the two control chips. The two control chips can be, for example, a North Bridge chip and a South Bridge chip. With VLINK, the total number of signal lines for data communication between the North Bridge chip and the South Bridge chip can be reduced to 15, which is significantly less than 45 in the case of the prior art, so that communication performance can be enhanced. Details of the invention are disclosed in the following with reference to FIGS. 3, 4, 5, 6, and 7.

Figure 3:
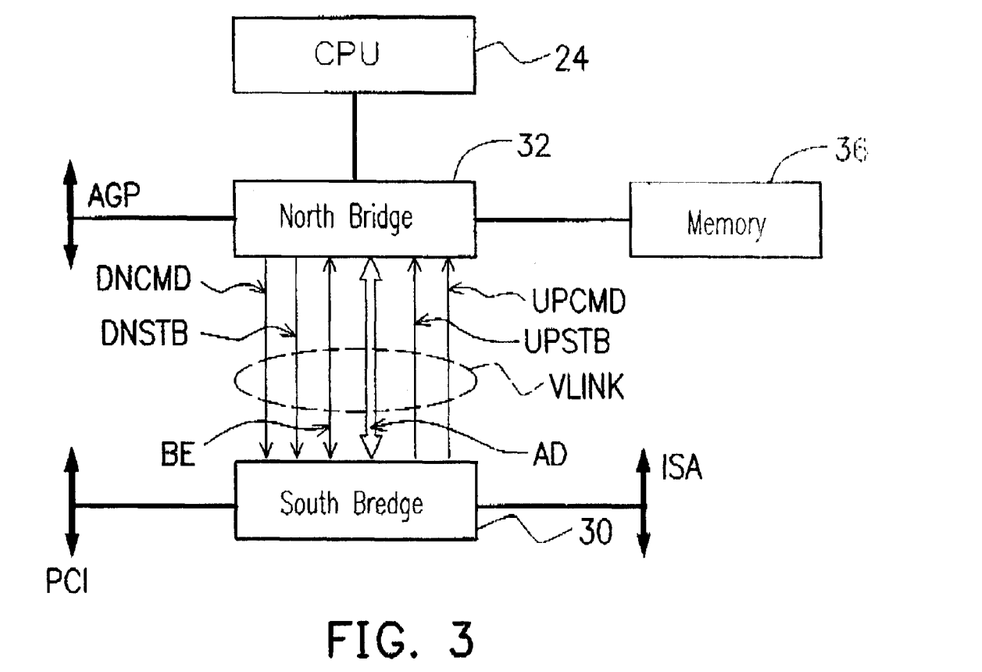
FIG. 3 is a schematic diagram showing the architecture of a computer system utilizing the method of the invention for bus arbitration between a North Bridge chip and a South Bridge chip.

FIG. 3 is a schematic diagram showing the architecture of a computer system utilizing the method of the invention. As shown, the computer system includes a CPU 24, a South Bridge chip 30, a North Bridge chip 32, and a primary memory unit 36. The data communication between the South Bridge chip 30 and the North Bridge chip 32 is carried out through a VLINK-defined set of signal lines, including DNCMD, DNSTB, BE, AD, UPSTB, and UPCMD. The use of the VLINK scheme allows the total number of signal lines between the South Bridge chip 30 and the North Bridge chip 32 to be reduced to 15, which is significantly less than 45 in the case of the prior art. The meanings of these signals are depicted in the following table I.

TABLE I (VLINK-Defined Signals)

| Signal | Initiator | Significance |
| --- | --- | --- |
| CLK | | 66 MHz Clock Signal |
| DNSTB | North Bridge | Down Link Strobe |
| UPSTB | South Bridge | Up Link Strobe |
| DNCMD | North Bridge | Down Link Command |
| UPCMD | South Bridge | Up Link Command |
| BE | North Bridge/South Bridge | Byte Enable |
| AD[7:0] | North Bridge/South Bridge | Address/Data |
| VREF | Reference Voltage | |
| COMP | Impedance Comparison | |

As shown in FIG. 3, the data communication between the South Bridge chip 30 and the North Bridge chip 32 also includes the PCI-specified bus AD except that it is here reduced to 8 signal lines only. The PCI-specified signals CBE, FRAME, IRDY, TRDY, STOP, DEVSEL, REQ, and GNT are here collectively reduced to a single bi-directional signal line BE and single-directional signal lines DNCMD, DNSTB, UPSTB, and UPCMD. The VLINK-defined signal set includes South-Bridge-issued UPCMD (Up Link Command) and UPSTB (Up Link Strobe) and North-Bridge-issued DNCMD (Down Link Command) and DNSTB (Down Link Strobe). This allows the South Bridge chip 30 and the North Bridge chip 32 to be each capable of issuing command and strobe signals independently to gain control of the AD bus for data transfer.

Figure 4:
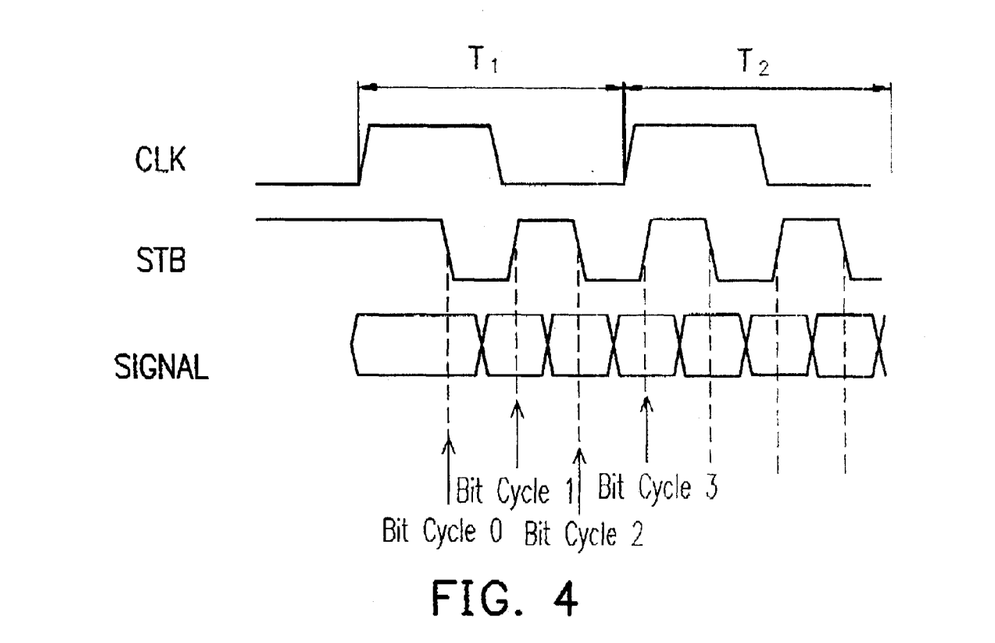
FIG. 4 is a signal diagram showing the waveforms and timings of various signals, utilized by the method of the invention.

FIG. 4 is a signal diagram showing the waveforms and timings of the strobe and data signals in reference to the clock signal defined by the VLINK scheme. As shown, each clock cycle includes two strobe cycles, which means that the above-mentioned UPSTB signal and DNSTB signal are each twice in frequency than the clock signal. Each clock cycle includes four rising/falling edges in the strobe signal, and therefore four bits of data can be defined during this period. As a result, a total of 32 bits of data can be transferred over the 8-bit AD bus during each clock signal. By contrast, the PCI bus architecture requires a total of 32 signal lines for the transfer of these data. The BE signal line is used to transfer the information about the data length, whose value can be from 1 to 16 (4 bits) during each clock cycle.

The UPCMD and DNCMD signals are used for defining the type of transaction being intended. The UPCMD signal is generated by the South Bridge chip 30, which includes C2PRA (Read Acknowledge from North Bridge to South Bridge), C2PWA (Write Acknowledge from North Bridge to South Bridge), P2CR (Read Request from South Bridge to North Bridge), and P2CW (Write Request from South Bridge to North Bridge). Table II shows the encoding of these signals in reference to bit cycles.

TABLE II (UPCMD)

| Bit Cycle REQ | Bit Cycle 1 PMSTR | Bit Cycle 2 MIO | Bit Cycle 3 WR | Signal |
|---|---|---|---|---|
| — | 0 | — | 0 | C2PRA |
| — | 0 | — | 1 | C2PWA |
| — | 1 | 0 | 0 | P2CR |
| — | 1 | 0 | 1 | P2CW |
| — | 1 | 1 | 1 | NOP |
| — | 1 | 1 | 0 | Preemptive REQ |
| 0 | — | — | — | UPREQ |

It is to be noted that the REQ (bus request) signal is issued during the bit cycle 0, which is not overlapped to the signal cycles of other types of transactions, so that it can be issued at any time, even during the same time when a transaction type command is being issued. The DNCMD signal is generated by the North Bridge chip 32, which includes C2PRIOR (I/O Read from North Bridge to South Bridge), C2PMR (Read Command from North Bridge to South Bridge), C2PIOW (I/O Write Command from North Bridge to South Bridge) C2PMW (Write Command from North Bridge to South Bridge), P2CRA (Read Acknowledge from South Bridge to North Bridge), P2CWA (Write Acknowledge from South Bridge to North Bridge). Table III shows the encoding of these signals in reference to bit cycles (noted that the definition for the GNT signal is not included).

TABLE III (DNCMD)

| Bit Cycle 0 REQ | Bit Cycle 1 PMSTR | Bit Cycle 2 MIO | Bit Cycle 3 WR | Significance |
|---|---|---|---|---|
| — | 0 | 0 | 0 | C2PIOR |
| — | 0 | 0 | 1 | C2PIOW |
| — | 0 | 1 | 0 | C2PMR |
| — | 0 | 1 | 1 | C2PMW |
| — | 1 | 0 | 0 | P2CRA |
| — | 1 | 0 | 1 | P2CWA |
| — | 1 | 1 | 1 | NOP |

TABLE III-continued (DNCMD)

| Bit Cycle 0 REQ | Bit Cycle 1 PMSTR | Bit Cycle 2 MIO | Bit Cycle 3 WR | Significance |
|---|---|---|---|---|
| — | 1 | 1 | 0 | Preemptive REQ |
| 0 | — | — | — | DNREQ |

When South Bridge issues a sequence of P2CR and/or P2CW signals, North Bridge will return in response the P2CRA and/or P2CWA signals. Similarly, when North Bridge issues a sequence of C2PIOR, C2PMR, C2PIOW, and C2PMW signals, South Bridge will return in response the C2PRA and C2PWA signals. These signals should be issued only after the data of the intended transaction are all readily prepared for transfer so as to prevent any undesired interruption in the data transfer. For instance, South Bridge can issue the P2CW signal only after the data of the intended transaction are all readily prepared for transfer, and North Bridge can issue the P2CRA signal only after the data of the intended transaction are all readily prepared for transfer. This can help prevent undesired interruption in the data transfer. When no read/write signals are to be issued, a NOP signal is generated Broadly defined, the invention is designed for use on a chipset including a first control chip and a second control chip (as the above-mentioned South Bridge chip and the North Bridge chip shown in FIG. 3), with the first control chip and the second control chip being interconnected by a VLINK-defined set of signal lines including a shared bi-directional bus, for the purpose of performing bus arbitration between the first control chip and the second control chip for exclusive use of the shared bi-directional bus. In the following, the term "bus owner" refers to the one of the two chips that currently holds the shared bi-directional bus, while the "bus receiver" refers to the other chip.

During operation, the second control chip needs to inform the first control chip about the fixed-cycle bus commands and the number of cycles to use the shared bi-directional bus. When the second control chip issues an access command (for example a read command) to the first control chip, the second control chip needs to register the number of pulses used for the transfer of the responding acknowledge signal and requested data from the first control chip. This information is dependent on the issued command from the second control chip. For instance, when South Bridge issues a P2CR signal to North Bridge, since the P2CR signal includes the information about the data length and since no waiting state is required for any VLINK-defined signal, South Bridge can learn the number of pulses required for the transfer of the responding P2CRA signal and requested data.

TABLE IV (Preemptive Bus Arbitration Scheme by the Invention)

| Current Bus Owner | DNREQ | UPREQ | Next Bus Owner | Preemptibility |
|---|---|---|---|---|
| N | 0 | 0 | N | |
| N | 0 | 1 | S | |
| N | 1 | 0 | N | |
| N | 1 | 1 | N | S-Preemptible |
| S | 0 | 0 | S | |
| S | 1 | 0 | N | |

TABLE IV-continued (Preemptive Bus Arbitration Scheme by the Invention)

| Current Bus Owner | DNREQ | UPREQ | Next Bus Owner | Preemptibility |
| --- | --- | --- | --- | --- |
| S | 0 | 1 | S | |
| S | 1 | 1 | S | N-Preemptible |

Table IV shows the preemptive bus arbitration scheme performed by the invention. In this table, N represents the first control chip (for example the North Bridge chip 32 shown in FIG. 3); S represents the second control chip (for example the South Bridge chip 30 shown in FIG. 3); DNREQ represents the bus request signal issued by the first control chip; and UPREQ represents the bus request signal issued by the second control chip. Further, "S-Preemptible" means that the second control chip is allowed to issue the high priority (preemptive) request when the first control chip is currently the bus owner; while "N-Preemptible" means that the fist control chip is allowed to issue the high priority (preemptive) request when the second control chip is currently the bus owner. The meaning of this table is explained in the following.

Assume at initialization that the first control chip is set as the bus owner. Thereafter, if both the first control chip and the second control chip issue no bus request signals, the first control chip will continue as the bus owner.

If the first control chip issues no bus request signal while the second control chip issues the bus request signal UPREQ, the bus will be handed to the second control chip.

On the other hand, if the first control chip issues the bus request signal DNREQ while the second control chip issues no bus request signal, the bus is still held by the first control chip.

In the event that the first control chip issues the bus request signal DNREQ while the second control chip issues the bus request signal UPREQ at the same time, the bus will still be held by the first control chip. However, the second control chip can issue a preemptive request via the UPCMD signal line to ask for the use of the bus. The preemptive request will activate the first control chip to start a latency timer; and by the time the latency timer reaches its preset time, the bus is handed to the second control chip.

Further, assume the second control chip is currently the bus owner. Thereafter, if both the first control chip and the second control chip issue no bus request signals, the second control chip will continue as the bus owner.

If the second control chip issues no bus request signal while the first control chip issues the bus request signal DNREQ, the bus will be handed to the first control chip.

On the other hand, if the second control chip issues the bus request signal UPREQ while the first control chip issues no bus request signal, second control chip will continue as the bus owner.

In the event that the second control chip issues the bus request signal UPREQ while the first control chip issues the bus request signal DNREQ at the same time, the bus will still be held by the second control chip. However, the first control chip can issue a preemptive request via the DNCMD signal line to ask for the use of the bus. The preemptive request will activate the second control chip to start a latency timer; and by the time the latency timer reaches its preset time, the bus is handed to the first control chip.

After the second control chip issues the bus request signal UPREQ, it also detects whether the first control chip issues its request signal DNREQ. If no request is issued by the first control chip, the second control chip will first wait for a preset period of time before gaining control of the bus. The purpose of this waiting period is to prevent the circumstance where the other control chip, i.e., the first control chip, has issued a bus request signal which is not immediately detected by the second control chip due to signal transmission delay. Besides, in order to prevent the two control chips from concurrently driving the bus, the current bus owner will delay for one more cycle, called turn-around cycle, before handing the bus to the other chip. Neither the bus owner nor the bus receiver drives the bus during the turn around cycle.

On the other hand, if the second control chip detects that the bus is currently being used by the first control chip, the second control chip will wait until the first control chip completes the use of the bus before it can gain control of the bus. In the event that the second control chip intends to carry out a high-priority transaction, for example for transfer of video/audio data, it can issue a preemptive request signal via the UPCMD signal line, which can then force the first control chip to relinquish the control of the bus and hand it to the second control chip in the manner described above.

Figure 5:
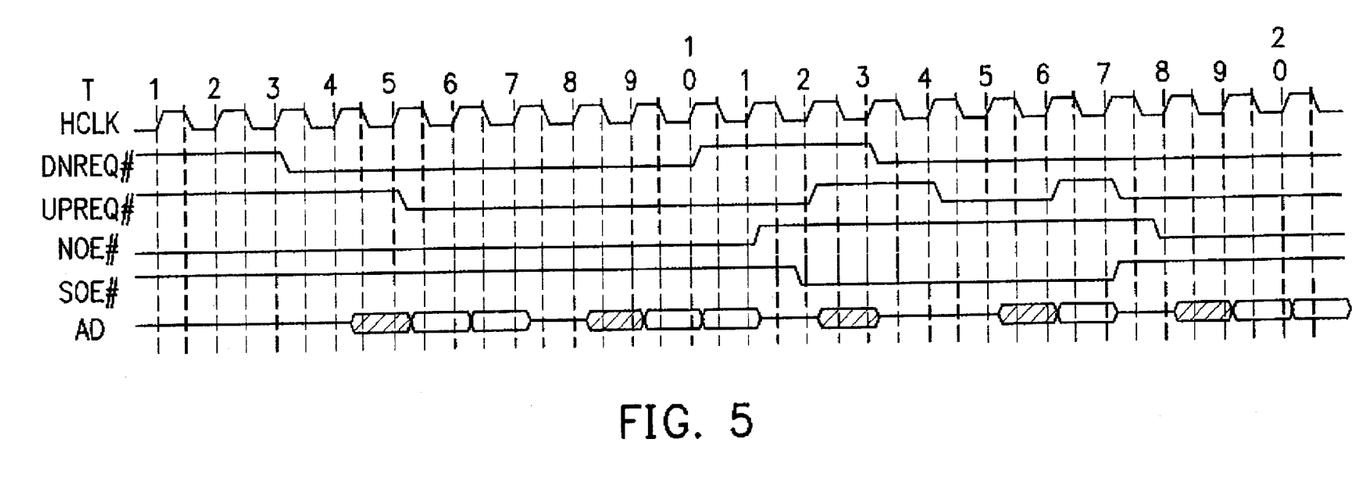
FIG. 5 is a signal diagram showing the waveforms and timings of various signals utilized by the method of the invention.
Figure 6:
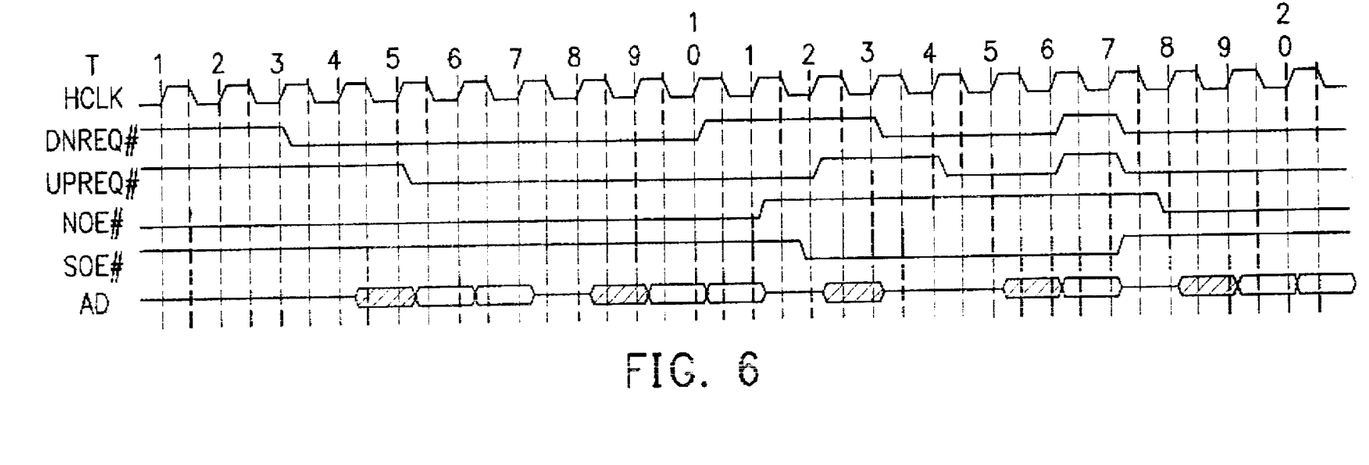
FIG. 6 is a signal diagram showing the waveforms and timings of various signals utilized by the method of the invention.

FIGS. 5 and 6 are signal diagrams respectively showing the waveforms and timings of the various signals utilized by the first control chip and the second control chip for requesting to use the bus. In this signal diagram, HCLK represents the system clock signal; DNREQ# represents the bus request signal issued by the first control chip; UPREQ# represents the bus request signal issued by the second control chip; NOE# represents the output enable signal from the first control chip; SOE# represents the output enable signal from the second control chip; and AD represents the address/data signal transmitted over the shared bi-directional bus between the first control chip and the second control chip (the symbol # denotes that the associated signal is enabled when being put into low voltage state).

Referring to FIG. 5, during T1 and T2, DNREQ# and UPREQ# are both disabled (HIGH) by default, thereby setting the first control chip as the bus owner. To carry out a transaction at T4, DNREQ# should be enabled (LOW) at T3. At T5, UPREQ# is enabled (LOW). However, since DNREQ# remains in enabled state until T11, the second control chip is unable to become the bus owner before this time. Since the first control chip does not need to use the bus at T11, it disables DNREQ# at T10. Further, since UPREQ# remains in an enabled state until T9 and DNREQ# becomes disabled at T10, NOE# becomes disabled at T11. This makes T11 the turn-around cycle. During T11, the second control chip puts the data of the intended transaction on the bus, and at the subsequent T12, these data can be transferred over to the bus. Since the second control chip will not use the bus at T13, UPREQ# is disabled at T12. However, since DNREQ# remains in a disabled state during T11 and T12, the bus is still held by the second control chip. At T13, DNREQ# becomes enabled; and since UPREQ# remains enabled in the subsequent T14, the bus is still held by the second control chip. At T15, the second control chip issues a transaction request and thus DNREQ# is enabled. At T16, UPREQ# becomes disabled. This causes the second control chip to relinquish its control over the bus at T17; and at the subsequent T18, the first control chip becomes the bus owner.

FIG. 6 shows the signal diagram in the case of a dummy request. In this case, the signal waveforms are substantially the same as FIG. 5 except that the DNREQ# becomes disabled at T16 and then becomes enabled at T17. At T18, the first control chip is the bus owner while the second control chip is the bus receiver. At this time, the first control chip issues a transaction request. Before this, the first control chip has disabled DNREQ# at T16 and the second control chip has enabled UPREQ# at T15; consequently, the second control chip, after it has been turned from bus owner into bus receiver, will be unable to become bus owner for the next two cycles after the turn-around cycle.

Figure 7:
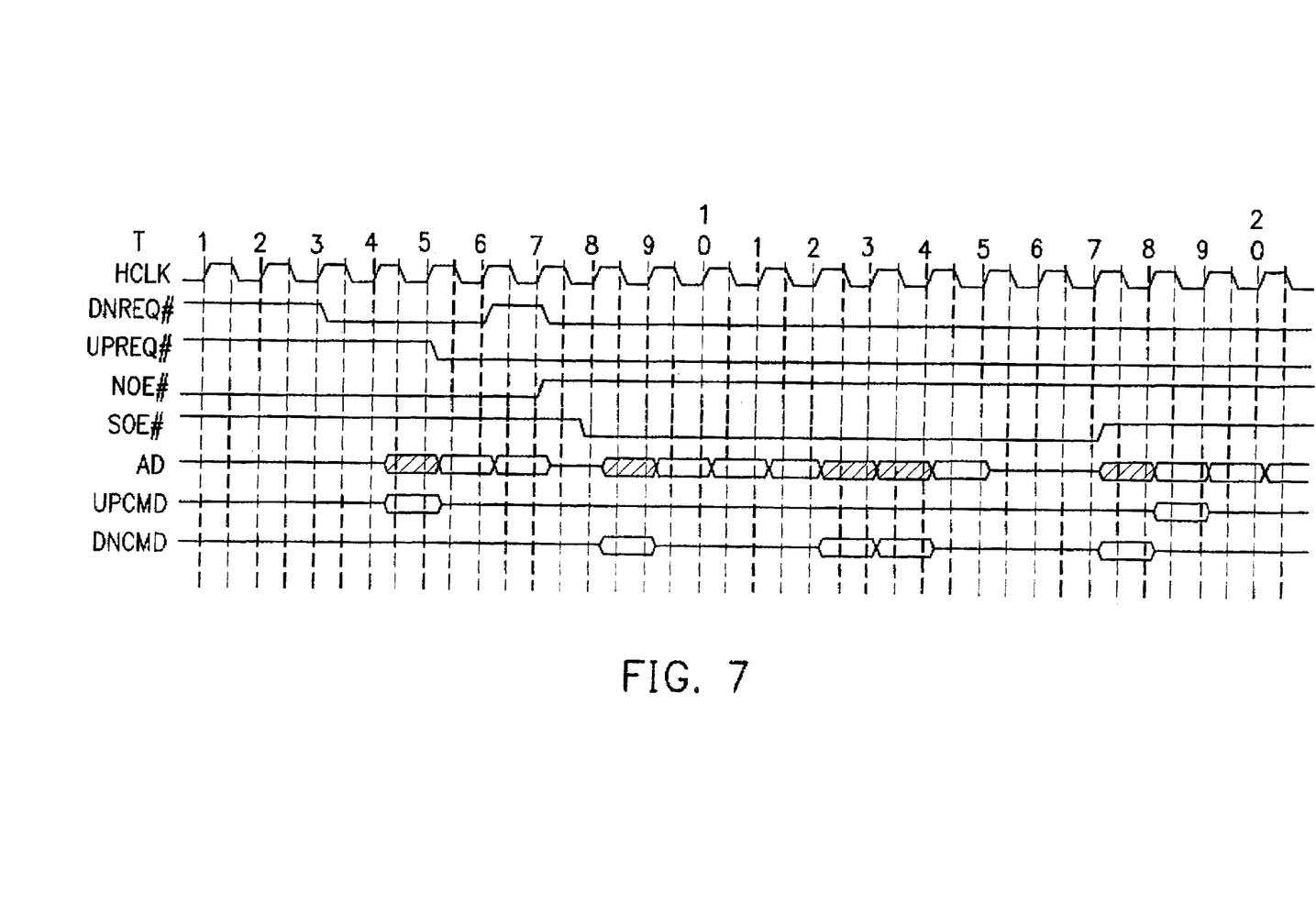
FIG. 7 is a signal diagram showing the waveforms and timings of various signals utilized by the method of the invention.

FIG. 7 is a signal diagram showing the waveforms and timings of various signals utilized by the first control chip and the second control chip when issuing a preemptive request to use the bus. In the case of FIG. 5, the first control chip disables DNREQ# at T6 since it has no transaction at T7. However, this action makes T7 become a turn-around cycle, thus causing the first control chip to give up the bus at T7 and the second control chip to become the bus owner at T8.

In the case of FIG. 5, assume the second control chip intends to use the bus at T5 but is unable to do so due to the first control chip still enabling DNREQ#. Under this circumstance, the second control chip can use the UPCMD signal to issue a preemptive request. As shown in FIG. 7, assume the first control chip intends to use the bus at T7 but the second control chip is still enabling UPREQ#. In this case, the first control chip can use the DNCMD signal to issue a preemptive request to tell the second control chip that it intends to carry out a high-priority transaction over the bus. In response to this request, the second control chip will first start a latency timer; by the time the latency timer reaches its preset time, the second control chip will unconditionally hand the bus to the first control chip, allowing the first control chip to use the bus to carry out the intended high-priority transaction.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for use on a chipset having a first control chip and a second control chip which are interconnected by a shared bi-directional bus for data transfer between the first control chip and the second control chip, the method being intended for performing bus arbitration between the first control chip and the second control chip for control of the shared bi-directional bus, the method comprising the steps of:

in an event where the second control chip intends to use the shared bi-directional bus, activating the second control chip to issue a bus request signal;

if the first control chip disables its bus request signal, assigning the shared bi-directional bus to the second control chip;

in an event where the second control chip intends to carry out a high-priority transaction while the first control chip is currently holding the shared bi-directional bus, activating the second control chip to issue a preemptive request;

in response to the preemptive request from the second control chip, activating the first control chip to start a first latency timer; and assigning the second control chip as bus owner by a time when the first latency timer reaches its preset time.

2. The method of claim 1, wherein, at initialization, the first control chip is assigned as bus owner, while the second control chip is assigned as bus receiver.

3. The method of claim 2, wherein the current bus receiver can gain control of the shared bi-directional bus at a given cycle provided that the current bus owner has already disabled its bus request signal two cycles before the given cycle and the bus receiver has enabled its bus request signal three cycles before the given cycle.

4. The method of claim 3, wherein after the current bus receiver gains control of the shared bi-directional bus, it has to wait for a turn-around cycle to be capable of driving the shared bi-directional bus.

5. The method of claim 2, wherein at a given cycle if the current bus owner wants to determine whether it will continue to hold the shared bi-directional bus, the current bus owner checks the logic state of its bus request signal at the previous cycle before the given cycle and the logic state of the bus request signal of the bus receiver at the second previous cycle before the given cycle.

6. The method of claim 1, wherein the first control chip and the second control chip are linked to each other via a set of signal lines including an address/data: bus, a length/byte enable signal line, an up link command signal line, an up strobe signal, a down link command signal line, a down strobe signal line, and a clock signal line.

7. The method of claim 6, wherein the preemptive request is transferred via the up link command signal line and the down link command signal line.

8. The method of claim 6, wherein the shared bi-directional bus includes the address/data bus and the length/byte enable signal line.

9. The method of claim 1, wherein the first control chip is a North Bridge chip while the second control chip is a South Bridge chip.

10. The method of claim 1, wherein the first control chip is a South Bridge chip while the second control chip is a North Bridge chip.

11. The method of claim 1, wherein the method further comprises the steps of:

in an event where the first control chip intends to use the shared bi-directional bus, activating the first control chip to issue its bus request signal;

if the second control chip disables its bus request signal, assigning the shared bi-directional bus to the first control chip;

in an event where the first control chip intends to carry out a high-priority transaction while the second control chip is currently holding the shared bi-directional bus, activating the first control chip to issue its preemptive request;

in response to the preemptive request from the first control chip, activating the second control chip to start a second latency timer; and assigning the first control chip as bus owner by a time when the second latency timer reaches its preset time.

* * * * *